(12) United States Patent
Gassmann et al.

(10) Patent No.: US 6,851,906 B2
(45) Date of Patent: Feb. 8, 2005

(54) NAIL-SHAPED FASTENING ELEMENT

(75) Inventors: Horst-Detlef Gassmann, Ruggell (LI); Hans Hachtel, Schaan (LI); Jens-Jörg Esser, Hohenems (DE); Ralf Laternser, Lohmar (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/127,261

(22) Filed: Apr. 22, 2002

(65) Prior Publication Data

US 2002/0187018 A1 Dec. 12, 2002

(30) Foreign Application Priority Data

Apr. 23, 2001 (DE) .......................................... 101 19 799

(51) Int. Cl.[7] .............................................. F16B 15/00
(52) U.S. Cl. ...................... 411/440; 411/490; 411/492
(58) Field of Search ................................ 411/440, 441, 411/480, 484, 487, 490, 492, 498

(56) References Cited

U.S. PATENT DOCUMENTS

| 3,850,073 A | * | 11/1974 | Hayes ........................ 411/453 |
| 4,915,561 A | * | 4/1990 | Buhri et al. ................. 411/439 |
| 4,979,858 A | * | 12/1990 | Van Allman et al. ........ 411/441 |
| 5,261,770 A | * | 11/1993 | Hoepker et al. ............. 411/441 |
| 6,171,042 B1 | * | 1/2001 | Olvera et al. ................ 411/441 |

FOREIGN PATENT DOCUMENTS

| CH | 0310310 | 10/1955 | |
| DE | 1019869 | 11/1957 | |
| EP | 0926361 | 6/1999 | |
| GB | 2150054 A | * 6/1985 | ........... B21D/53/36 |

* cited by examiner

Primary Examiner—William L. Miller
(74) Attorney, Agent, or Firm—Sidley Austin Brown & Wood, LLP

(57) ABSTRACT

A nail-shaped fastening element having a stem, and a head (3, 13, 23, 33) provided at one end of the stem and projecting radially beyond the stem with the stem tapering at its another, free end toward a tip (5, 15, 25, 35) and having a spherical, first section (1, 11, 21, 31) extending from the tip (5, 15, 25, 35) in a direction toward the head (3, 13, 23, 33), and a second conical section (2, 12, 22, 32) adjoining the first section (1, 11, 21, 31) and having a length (L2, L12, L22, L32) smaller than a length (L1, L11, L21, L31) of the first section (1, 11, 21, 31).

8 Claims, 2 Drawing Sheets

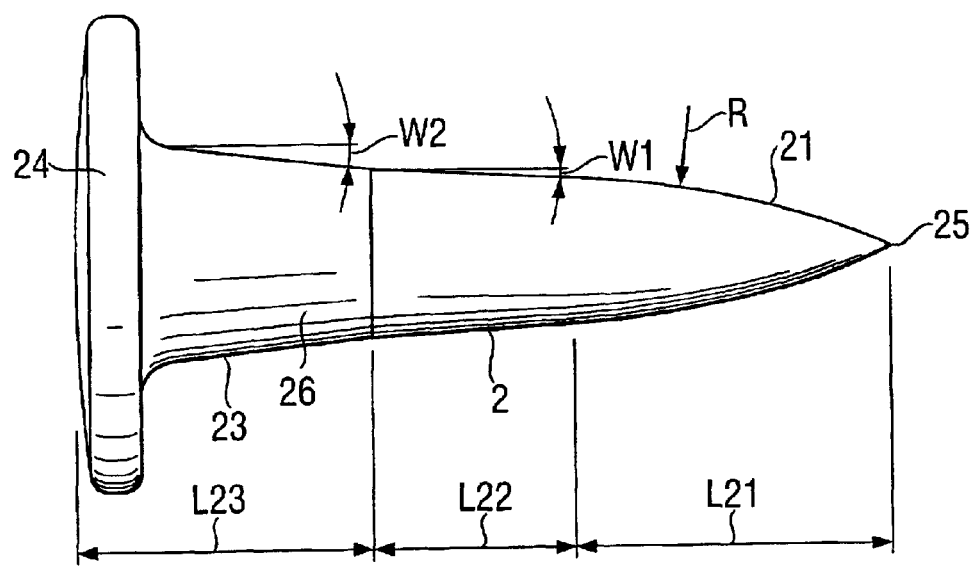
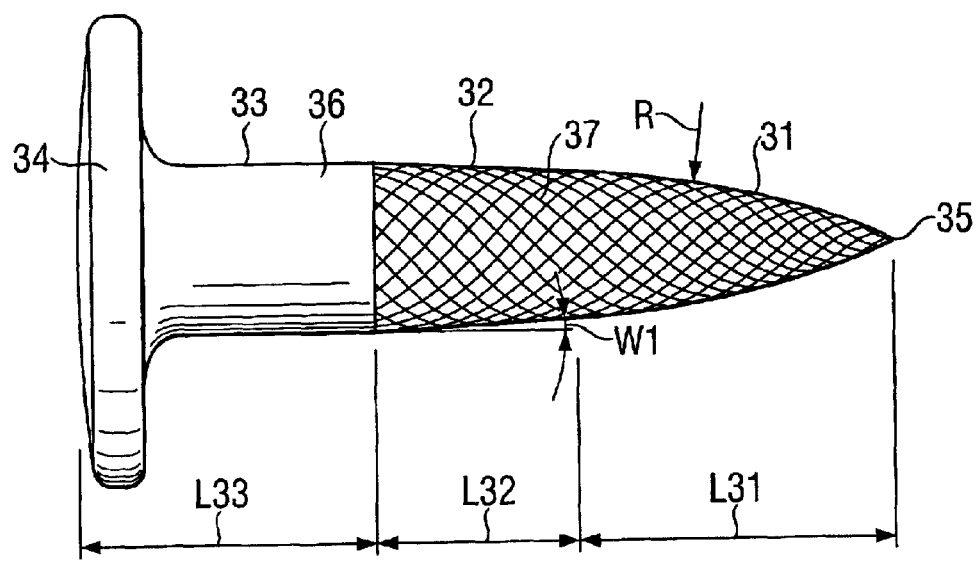

NAIL-SHAPED FASTENING ELEMENT

BACKGROUND OF THE INVENTION

1. Field of the Invention

The present invention relates to a nail-shaped fastening element having a stem, and a head provided at one end of the stem and projecting radially beyond the stem, with the stem tapering at its other, free end toward a tip and having a spherical, first section extending from the tip in a direction toward the head, and a second section adjoining the first section.

2. Description of the Prior Art

Nail-shaped fastening elements are used for securing constructional parts to hard constructional components formed, e.g., of steel, concrete and stone. The nail-shaped fastening elements are driven into the constructional components with explosive powder-actuated setting tools. A nail-shaped fastening element is disclosed, e.g., in German Publication DE 1 575 152. The disclosed fastening element has a stem at one end of which, there is provided a head the outer contour of which has an outer thread. The stem tapers toward a tip at its other, free end. The stem has, starting from the tip, two sections arranged one after another, with the first section having a spherical shape and widening in a direction toward the head. The second section is formed as a conical section which likewise widens toward the head. The largest diameter of the first section is equal to the smallest diameter of the second section. The inclination angle of the second, conical section amounts to 3°. The length of the second conical section, which is measured in the direction parallel to the longitudinal extent of the fastening element, is rather large. Therefore, for driving the fastening element, which is disclosed in DE-1 575 152, a very high drive energy is required as the second section should displace sidewise a large amount of the material of the constructional component.

Accordingly, an object of the present invention is to provide a nail-shaped fastening element that can be economically produced, has a short length, and permits to obtain an approximately the same holding force as the known fastening element and, at the same time, requires less driving energy for driving it into the constructional component than the known fastening element.

SUMMARY OF THE INVENTION

This and other objects of the present invention, which will become apparent hereinafter, are achieved by providing a nail-shaped fastening element of the type discussed above in which the length of the second section is smaller than the length of the first section.

Because of a shorter length of the second section, less material of the constructional component needs to be displaced sidewise upon driving the inventive fastening element in the constructional component.

The length of the second section of the stem of the inventive fastening element depends on the strength of the material of the constructional component the fastening element is to be driven in. Preferably, the length of the second section amounts to from 0.16 to 0.95 times of the length of the first section and to from 0.17 to 0.95 times of the head length.

The fastening elements, which are to be driven in a very hard constructional component should have a very short length. When the material of the constructional component is weak, the length of the second section of the stem can be rather large.

When constructional parts are to be secured to constructional component with a preload, fastening elements are used the head of which is formed of a conical region which adjoins the second section of the stem, and a flange-shaped widening projecting radially beyond the conical region, with an inclination angel of the conical region of the head being larger than an inclination angle of the second, conical section of the stem.

The head conical region can have an inclination angle of, e.g., from 7° to 9°. Upon driving of such a fastening element in the constructional component, the clamping of the head conical region in the bore of the constructional component progressively increases, whereby the head is pulled toward the surface of the constructional component.

Good driving-in characteristics of fastening element and a large-surface support of the fastening element head are achieved when the head is formed of a cylindrical region adjoining the second section of the stem, and a flange-shaped widening projects radially beyond the cylindrical region.

A releasable attachment of constructional parts to constructional components is preferably effected with fastening elements the head of which has a cylindrical region that projects radially beyond the second stem section and an outer contour of which is provided with a thread.

A better force transmission between the constructional component and the fastening element in the region of the stem and a reliable clamping or locking of the fastening element in the constructional component are achieved when, advantageously, the second, conical section of the stem has an inclination angle from 2° to 3.5°.

In order to reduce the amount of the material of the constructional components, which needs to be displaced during driving of a fastening element in, whereby the driving energy can be reduced, the first section tapers toward the tip under a radius from 20 mm to 35 mm.

For increasing the pull-out resistance of the driven-in fastening elements, advantageously, at least one of the two stem sections is at least partially provided with a shaped surface profile. A particularly high pull-out resistance at a small setting depth is achieved when it is the first section which is at least partially provided with a shaped surface profile that can be in from of knurling. The knurling improves the formlocking connection between the fastening element and the constructional component. When the knurling is provided on the first stem section, it preferably is provided along the entire length of the first section up to the tip. The depth of the knurling varies from 0.4 mm, in the transition region between the first and second sections to 0.15 mm in the tip region. The shaped surface profile can be provided also only on the second section or on both first and second sections.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 shows a side view of a third embodiment of a nail-shaped fastening element according to the present invention;

FIG. 4 shows a side view of a fourth embodiment of a nail-shaped fastening element according to the present invention.

DETAILED DESCRIPTION OF THE PREFERRED EMBODIMENT

Figure 1:
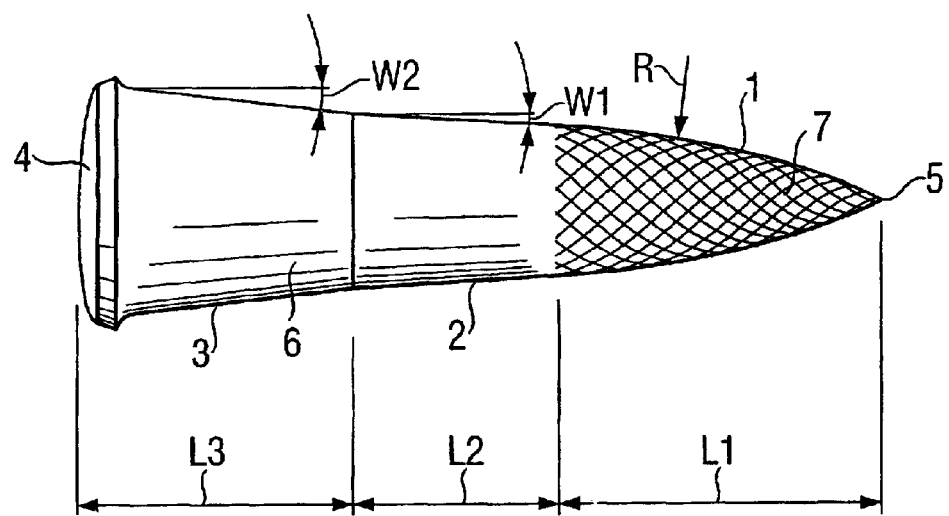
FIG. 1 shows a side view of a first embodiment of a nail-shaped fastening element according to the present invention.
Figure 2:
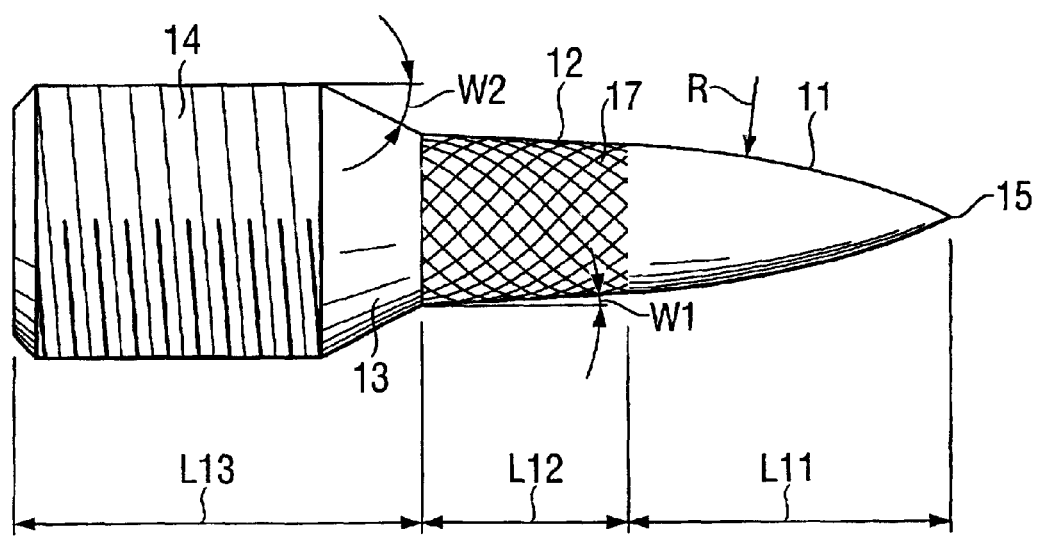
FIG. 2 shows a side view of a second embodiment of a nail-shaped fastening element according to the present invention.

A nail-shaped fastening element according to the present invention, which is shown in FIGS. 1–4, has a stem and a head 3, 13, 23, 33 having a length L3, L13, L23, L33, respectively, and projecting radially beyond the stem. The head 3, 13, 23, 33 is located at the first end of the stem. At its second end, opposite the first end, the stem tapers toward a tip 5, 15, 23, 35. Starting from the tip 5, 15, 25, 35, a a substantially bullet-shaped first section 1, 11, 21, 31 of the stem extends in the direction toward the head 3, 13, 23, 33. A conical second section 2, 12, 22, 32 adjoins the first section 1, 11, 21, 31. The first section 1, 11, 21, 31 tapers toward the tip 5, 15, 25, 35 under a continuous radius of 25 mm. The cross-sections of both first and second sections 1, 11, 21, 31 and 2, 12, 22, 32 taken transverse to the longitudinal axis of the fastening element increase toward the head 3, 13, 23, 33. The second section 2, 12, 22, 32 has an inclination angle W1 of 2.8°.

The smallest diameter of the second section 2, 12, 22, 32 is equal to the largest diameter of the first section 1, 11, 21, 31, and the largest diameter of the second section 2, 12, 22, 32 is equal to the smallest diameter of the head 3, 12, 23, 33. The length L2, L12, L22, L32 of the second section 2, 12, 22, 32 corresponds, e.g., to 0.66 of the length L1, L11, L21, L31 of the first section 1, 11, 21, 31.

In the embodiments of the nail-shapes fastening element, which are shown in FIGS. 1 and 4, the first section 1, 31 is provided with a shaped surface profile 7, 37. The shaped surface profile 7, 37 can be formed as knurling the depth of which amounts from 0.1 mm to 0.3 mm.

In the embodiments of an inventive fastening element, which are shown in FIGS. 1 and 3, the head 3, 23 is formed of a conical region 6, 26 and a flange-shaped widening 4, 24. In the fastening element shown in FIG. 1, the flange-shaped widening 4 has a diameter corresponding to 1.05÷1.15 of the largest diameter of the conical region 6. In the fastening element shown in FIG. 3, the flange-shaped widening 24 has an outer diameter that corresponds to from 1.4 to 2.4 of the largest diameter of the conical section 26. The inclination angle W2 of the conical region 6, 26 of the head 3, 23 amounts to from 6° to 10° and is, thus, greater than the inclination angle W1 of the second section 6, 26.

In the fastening element shown in FIG. 3, the head 13 is formed of a cylindrical region 14 and a conical region 16 located between the cylindrical region 14 and the second stem section 12. The outer contour of the cylindrical region 14 is provided with an outer thread.

In the fastening element shown in FIG. 4, the head 33 is formed of a cylindrical region 36 and a flange-shaped widening 34 that projects radially beyond the cylindrical region 36. The diameter of the cylindrical region 36 corresponds to the largest diameter of the second stem section 32. The diameter of the flange-shaped widening 34 of the head 33 corresponds to from 1.4 to 3.3 of the diameter of the cylindrical region 36.

Through the present invention was shown and described with references to the preferred embodiments such are merely illustrative of the present invention and are not to be construed as a limitation thereof, and various modifications to the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A nail-shaped fastening element, comprising a stem; and a head (3, 13, 23, 33) provided at one end of the stem and projecting radially beyond the stem, the stem tapering at another, free end thereof toward a tip (5, 15, 25, 35) and having a substantially bullet-shaped first section (1, 11, 21, 31) extending from the tip (5, 15, 25, 35) in a direction toward the head (3, 13, 23, 33), and a second conical section (2, 12, 22, 32) adjoining the first section (1, 11, 21, 31), extending between the first section and the head (3, 13, 23, 33), tapering substantially uniformly toward the tip at a uniform inclination angle, and having a length (L2, L12, L22, L32) smaller than a length (L1, L11, L21, L31) of the first section (1, 11, 21, 31).

2. A fastening element according to claim 1, wherein the length (L2, L12, L22, L32) of the second section corresponds from 0.16 to 0.95 times of the length (L1, L11, L21, L31) of the first section (1, 11, 21, 31).

3. A fastening element according to claim 1, wherein the length (L2, L12, L22, L32) of the second section (2, 12, 22, 32) is smaller than a length (L3, L13, L23, L33) of the head (3, 13, 23, 33).

4. A fastening element according to claim 1, wherein the head (3, 13, 23) is formed of a conical region (6, 16, 26) which adjoins the second section (2, 12, 22) of the stem, and a flange-shaped widening (4, 14, 24) projecting radially beyond the conical region (6, 16, 26), and wherein an inclination angle (W2) of the conical region (6, 16, 26) of the head (3, 13, 23) is larger than an inclination angle (W1) of the second section (2, 12, 22) of the stem.

5. A fastening element according to claim 1, wherein the conical second section (2, 12, 22, 32) of the stem has an inclination angle (W1) from 2° to 3.5°.

6. A fastening element according to claim 1, wherein the first section (1, 11, 21, 31) diminishes toward the tip (5, 15, 25, 35) under a radius (R) from 20 mm to 35 mm.

7. A fastening element according to claim 1, wherein at least one of the first and second sections (1, 11, 21, 31; 2, 12, 22, 32) of the stern is provided, at least partially, with a shaped surface profile (7, 17, 37).

8. A nail-shaped fastening element, comprising a stem; and a head (3, 13, 23, 33) provided at one end of the stem and projecting radially beyond the stem, the stem tapering at another, free end thereof toward a tip (5, 15, 25, 35) and having a substantially bullet-shaped first section (1, 11, 21, 31) extending from the tip (5, 15, 25, 35) in a direction toward the head (3, 13, 23, 33), and a second conical section (2, 12, 22, 32) adjoining the first section (1, 11, 21, 31,) tapering substantially uniformly toward the tip, and having a length (L2, L12, L22, L32) smaller than a length (L1, L11, L21, L31) of the first section (1, 11, 21, 31), wherein the head (33) is formed of a cylindrical region (36) adjoining the second section (32) of the stem, and a flange-shaped widening (34) projecting radially beyond the cylindrical region (36).

* * * * *